US008655343B2

(12) United States Patent
Chatani

(10) Patent No.: US 8,655,343 B2
(45) Date of Patent: Feb. 18, 2014

(54) SERVER CONNECTION METHOD, SERVER, AND REMOTE CONTROL SYSTEM

(75) Inventor: Masayuki Chatani, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 13/607,928

(22) Filed: Sep. 10, 2012

(65) Prior Publication Data
US 2012/0329430 A1 Dec. 27, 2012

Related U.S. Application Data

(63) Continuation of application No. PCT/JP2011/000881, filed on Feb. 17, 2011.

(30) Foreign Application Priority Data

Apr. 14, 2010 (JP) .................................. 2010-093514

(51) Int. Cl.
H04M 3/00 (2006.01)
(52) U.S. Cl.
USPC ............ 455/419; 455/418; 455/420; 455/411
(58) Field of Classification Search
None
See application file for complete search history.

(56) References Cited

U.S. PATENT DOCUMENTS

| 7,295,543 B2 * | 11/2007 | Kikuchi et al. ............... 370/338 |
| 2002/0063633 A1 | 5/2002 | Park |
| 2003/0061380 A1 | 3/2003 | Saito et al. |
| 2004/0092282 A1 * | 5/2004 | Kim et al. ..................... 455/522 |
| 2007/0288606 A1 | 12/2007 | Kito et al. |
| 2009/0156189 A1 * | 6/2009 | Ohman .......................... 455/418 |
| 2010/0082827 A1 * | 4/2010 | Evensen et al. ............... 709/229 |

FOREIGN PATENT DOCUMENTS

| JP | 2002-186058 | 6/2002 |
| JP | 2002-262365 | 9/2002 |
| JP | 2003-111156 | 4/2003 |
| JP | 2006-108899 | 4/2006 |
| JP | 2008-118599 | 5/2008 |

OTHER PUBLICATIONS

International Search Report dated May 17, 2011, from corresponding International Application No. PCT/JP2011/000881.
International Preliminary Report on Patentability and Written Opinion of the International Search Authority dated Nov. 6, 2012, from corresponding International Application No. PCT/JP2011/000881.

* cited by examiner

Primary Examiner — Suhail Khan
(74) Attorney, Agent, or Firm — Katten Muchin Rosenman LLP

(57) ABSTRACT

A system includes a server and an information terminal apparatus that can be locally connected to a cellular phone terminal, which can be connected to the server via a cellular phone communication network. With such a system, when the server receives a request to remotely control the information terminal apparatus, the server verifies the validity of the request. When the request is valid, the server establishes a connection to the cellular phone terminal, and transmits, via the cellular phone terminal, a packet which is an instruction to start up the information terminal apparatus. Upon receiving the start-up instruction packet transmitted from the server, the information terminal apparatus starts up and establishes a connection to the server.

7 Claims, 8 Drawing Sheets

| USER ID | XXXXX | |
|---|---|---|
| USER NAME | XXXXX | |
| PASSWORD | XXXXXXXX | |
| E-MAIL ADDRESS | XXX@XXX.XXX | |
| CELLULAR PHONE TERMINAL 1 | XXX-XXXX-XXXX | AP |
| CELLULAR PHONE TERMINAL 2 | XXX-XXXX-XXXX | |
| ⋮ | ⋮ | ⋮ |
| CELLULAR PHONE TERMINAL N | XXX-XXXX-XXXX | |
| INFORMATION TERMINAL APPARATUS 1 | IDXXXXXXXX | |
| INFORMATION TERMINAL APPARATUS 2 | IDXXXXXXXX | CL |
| ⋮ | ⋮ | ⋮ |
| INFORMATION TERMINAL APPARATUS N | IDXXXXXXXX | |

704

SERVER CONNECTION METHOD, SERVER, AND REMOTE CONTROL SYSTEM

BACKGROUND OF THE INVENTION

1. Field of the Invention

The present invention relates to a server, a server connection method using the server, and a remote control system using a network.

2. Description of the Related Art

With the popularization of network infrastructure such as the Internet, a device remote control technique is coming to be provided, which allows the user to remotely control a device from outside the home via the Internet. Various kinds of techniques for providing such a remote control operation have been proposed. For example, such a remote control operation is performed via a dedicated server, router, or the like, connected to the Internet (see Patent document 1).

RELATED ART DOCUMENTS

Patent Documents

[Patent Document 1]
  Japanese Patent Application Laid Open No. 2008-118599

In order to remotely control a device, there is a need to turn on the power supply for this device by means of a remote control operation. In many cases, a special packet is employed to instruct the device to start up. However, in a case in which communication is made using the Internet, from the viewpoint of security and so forth, packet filtering is performed by a router or the like configured as an interface between the device and the Internet. In some cases, this blocks passage of such a special packet used as an instruction to perform a startup operation. In some cases, by changing the settings of such a router or the like, such an arrangement allows such a special packet to pass through. However, in order to change such settings, the user must have a certain level of knowledge with respect to the network. That is to say, such settings are not necessarily readily accessible to every user. Furthermore, such a setting which enables passage of such a special packet used as an instruction to perform a startup operation is not preferable from the security viewpoint. In order to solve such a problem, there is a demand for a technique for securely starting up a device by means of a remote control operation.

SUMMARY OF THE INVENTION

The present invention has been made in order to solve such a problem. Accordingly, it is a general purpose of the present invention to provide a technique for securely starting up a device by means of a remote control operation.

In order to solve the aforementioned problem, an embodiment of the present invention relates to a remote control system. The remote control system comprises: a server; and an information terminal apparatus that can be locally connected to a cellular phone terminal, which can be connected to the server via a cellular phone communication network. The server is configured to receive a request to remotely control the information terminal apparatus, to authenticate the validity of the request, and, when the request is valid, to connect the cellular phone terminal and to transmit a start-up instruction packet to the information terminal apparatus via the cellular phone terminal. Upon receiving such a start-up instruction packet transmitted from the server, the information terminal apparatus is configured to start up and to establish a connection to the server.

Another embodiment of the present invention relates to a server. The server comprises: a remote control reception unit configured to receive, from the user via a network, a request to remotely control an information terminal apparatus; a search unit configured to search a database and to acquire a phone number of a cellular phone terminal that can be used for a remote control operation; and a start-up instruction unit configured to establish a connection to the cellular phone terminal that can be used for the remote control operation via a cellular phone communication network based on the phone number acquired by the search unit, and to transmit, via the cellular phone terminal, a packet as an instruction to start up an information terminal apparatus that is located within range of being connectable to the cellular phone terminal.

Yet another embodiment of the present invention relates to a server connection method for a system that comprises a server, and an information terminal apparatus that can be locally connected to a cellular phone terminal, which can be connected to the server. The server connection method comprises: receiving, by means of the server, a request to remotely control the information terminal apparatus, and authenticating the validity of the request; transmitting, by means of the server, a start-up instruction packet to the information terminal apparatus via the cellular phone terminal after connection is made to the server when the aforementioned request is valid; and starting up the information terminal apparatus, and connecting the information terminal apparatus to the server upon receiving such a start-up instruction packet transmitted from the server.

It should be noted that any combination of the aforementioned components or any manifestation thereof may be mutually substituted between a method, apparatus, system, computer program, data structure, recording medium, and so forth, which are effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Description will be made below with reference to the drawings regarding an embodiment of the present invention.

Figure 1:
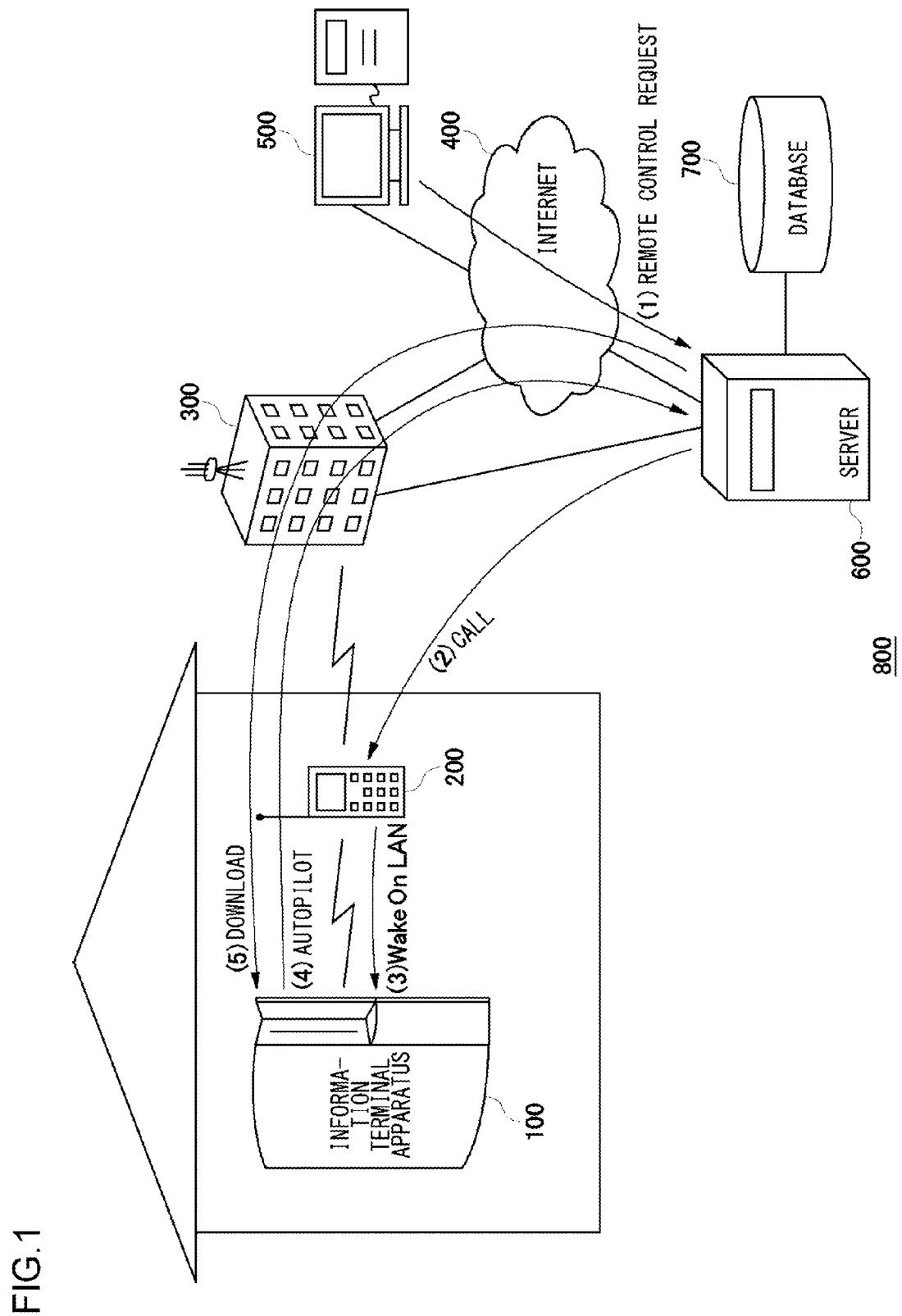
FIG. 1 is a schematic diagram which shows the outline of a remote control system according to an embodiment.

FIG. 1 is a schematic diagram showing a schematic configuration of a remote control system 800 according to the embodiment. The remote control system 800 is installed in the living room of the user's home or the like. The remote control system 800 includes an information terminal apparatus 100 such as a stationary game machine or the like configured to play back content such as movies, games, and so forth, a cellular phone terminal 200 which can be locally connected to the information terminal apparatus 100 by means of wireless LAN (Wireless Local Area Network) or a Wi-Fi function, a cellular phone communication network 300, the Internet 400, a remote control terminal apparatus 500, a server 600, and a database 700. Description will be made with reference to FIG. 1 regarding the outline of the embodiment.

The remote control terminal apparatus 500 is configured as a PC (Personal Computer) or a cellular phone terminal which can be connected to the Internet 400. (1) The user operates the remote control terminal apparatus 500 so as to access the server 600 via the Internet 400. The database 700 is connected to the server 600. The server 600 is configured to retrieve the phone number of the cellular phone terminal 200 with reference to the database 700. (2) The server 600 is configured to be connected to the cellular phone terminal 200 via the cellular phone communication network 300 based upon the phone number of the cellular phone terminal 200.

The cellular phone terminal 200 is configured to be connectable to the information terminal apparatus 100 via the wireless LAN (Local Area Network). The cellular phone terminal 200 is inserted into a cradle set up in the living room of the user's home or the like. In this state, the cellular phone terminal 200 is always in the incoming call standby state while it is being charged. The cellular phone terminal 200 has a function such as IEEE 802.11b/g wireless LAN or otherwise a Wi-Fi function, which enables communication at a maximum rate of 54 Mbps between it and the information terminal apparatus 100 configured as a Wi-Fi enabled device.

The term "Wi-Fi" represents a standard certified by the Wi-Fi Alliance, which is the industry group related to wireless LAN, with respect to mutual connectivity between wireless device. It should be noted that "Wi-Fi" is also referred to as "WiFi" or the like. The Wi-Fi logo is licensed to devices certified by the Wi-Fi Alliance with respect to mutual connectivity between wireless devices using the IEEE802.11 series (IEEE802.11a/IEEE802.11b), which is a communication standard.

The wireless LAN installed in the cellular phone terminal 200 is configured to be compatible with WPS (Wi-Fi Protected Setup). Thus, via a simple operation of the cellular phone terminal 200 such as pressing buttons on the cellular phone terminal 200 or the like, such an arrangement allows the user to configure settings for a Wi-Fi-enabled device (slave device) providing that it is compatible with the WPS.

The "WPS" represents a function which allows the user to configure settings for the connection or security of a wireless LAN device, which is a standard stipulated by the Wi-Fi Alliance. There are a great number of items and choices to be set for wireless LAN connection and encryption, and it is very difficult for the user to understand such technical terms, leading to a problem in that it is difficult for beginners to configure such settings. However, the devices that conform to WPS allow the user to configure settings for one device using another device in a simple manner without involving a great variety of input operations via a display. With the WPS, a wireless LAN access point or otherwise a wireless LAN router functions as a master device, and is configured to transmit setting information such as the SSID or WPA settings to a Wi-Fi enabled device (slave device) with which a connection is desired, such as a personal computer, game machine, or the like.

There are several methods as specific transmission methods. Examples of such specific transmission methods include: a push-button method in which the user is to push a dedicated button provided to each device; a PIN-code method in which the user is to input a multi-digit number issued by a master device to a slave device; an NFC method in which setting information is transmitted using the NFC function, which is a near field communication standard; and a USB-memory method in which the setting information stored in a USB memory device is transmitted to a slave device. With conventional techniques, such a simple setting function is provided by each manufacturer. However, each manufacturer has employed its own method independently, leading to a problem of poor compatibility with other devices provided by other manufacturers. With the advent of the WPS, each manufacturer is advancing development of devices that conform to WPS. Such a technique allows the user to configure settings for a device regardless of what manufacturer provides the device as long as it conforms to WPS.

The cellular phone terminal 200 has an access point mode which allows the cellular phone terminal 200 to function as a wireless LAN access point. The term "wireless LAN access point" represents a device configured to relay radio waves in order to establish a terminal connection via the wireless LAN, which provides communication via such an access point using a communication method which is a so-called infrastructure mode.

Wireless LAN access points are roughly classified into two types based upon their function, i.e., a bridge type and a router type. The bridge-type device is configured as a relay for simple data transmission, and is similar to a wired LAN hub. On the other hand, the router-type device has a routing function, an NAT (Network Address Translation) function, and so forth, and is configured as a relay that functions as an interface between different networks, e.g., between the Internet and the private network, and so forth.

In many cases, before connection via such a wireless LAN access point, IDs which are so-called ESSIDs are assigned to respective individual devices for identification. With such an arrangement, the wireless LAN access point functions as a communication relay for only the terminals having the same ESSID as that of the wireless LAN access point. This blocks undesired communication such as cross talk and so forth even in a non-ideal environment such as an office in which there are multiple wireless LAN access points within a short distance.

By setting the cellular phone terminal 200 having such a wireless LAN function to the access point mode so as to set the cellular phone terminal 200 to a wireless LAN access point (master device), such an arrangement allows the information terminal apparatus 100 to establish a local connection as a Wi-Fi enabled device (slave device). In this state, such an arrangement allows the user to enjoy the Internet, competitive games, and so forth, via the information terminal apparatus 100.

(3) Via the cellular phone terminal 200, the server 600 is configured to transmit a packet which instructs the information terminal apparatus 100 to start up. (4) Upon receiving such a packet which is an instruction to start up, the information terminal apparatus 100 performs a "Wake On LAN" operation so as to start up, following which the information terminal apparatus 100 automatically establishes a connection to the server 600 using an autopilot function. (5) After a connection to the server 600 is established, the information terminal apparatus 100 is configured to download content or the like from the server 600.

Here, the term "a packet which is an instruction to start up" represents a special packet which is used to turn on the power supply for a network device by means of a remote control operation. Examples of such special packets include a magic packet (trademark) and so forth.

Such a magic packet mainly employs a packet format in which, as the destination addresses, first, "FF:FF:FF:FF:FF:FF", i.e., the broadcast address, is set, following which the same MAC address of the network device to be started up is consecutively set 16 times. For example, in a case in which the MAC address of such a network device to be started up is "EE:EE:EE:00:00:01", the packet to be transmitted is a packet in the form "FF:FF:FF:FF:FF:FF, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01, EE:EE:EE:00:00:01".

When such a packet reaches an L2 switch (layer 2 switch), which is one of the relay devices in the network, this packet is transmitted to the whole broadcast domain according to the broadcast address set at the beginning of the packet. Eventually, the power supply state of the network device to be started up is switched, thereby supplying power to this device.

As described above, such a magic packet includes a special data pattern in the Ethernet (trademark) frame. The protocol to be used to design such a magic packet is not restricted in particular. However, in some cases, such a packet cannot pass through an IP router used in a network using TCP/IP, depending on the kind of protocol used by an application configured to transmit such a magic packet.

In a case in which the magic packet is configured as an IP packet, and in a case in which an application configured to transmit a magic packet transmits such a magic packet configured as an IP packet, when the IP packet is routable, this IP packet can pass through the IP router. On the other hand, when the IP packet is not routable, this IP packet cannot pass through the IP router, and the magic packet is lost before it passes through the IP router. It is needless to say that, when the magic packet is configured as a broadcast packet or a multi-cast packet other than such an IP packet, such a magic packet cannot pass through the IP router.

Figure 2:
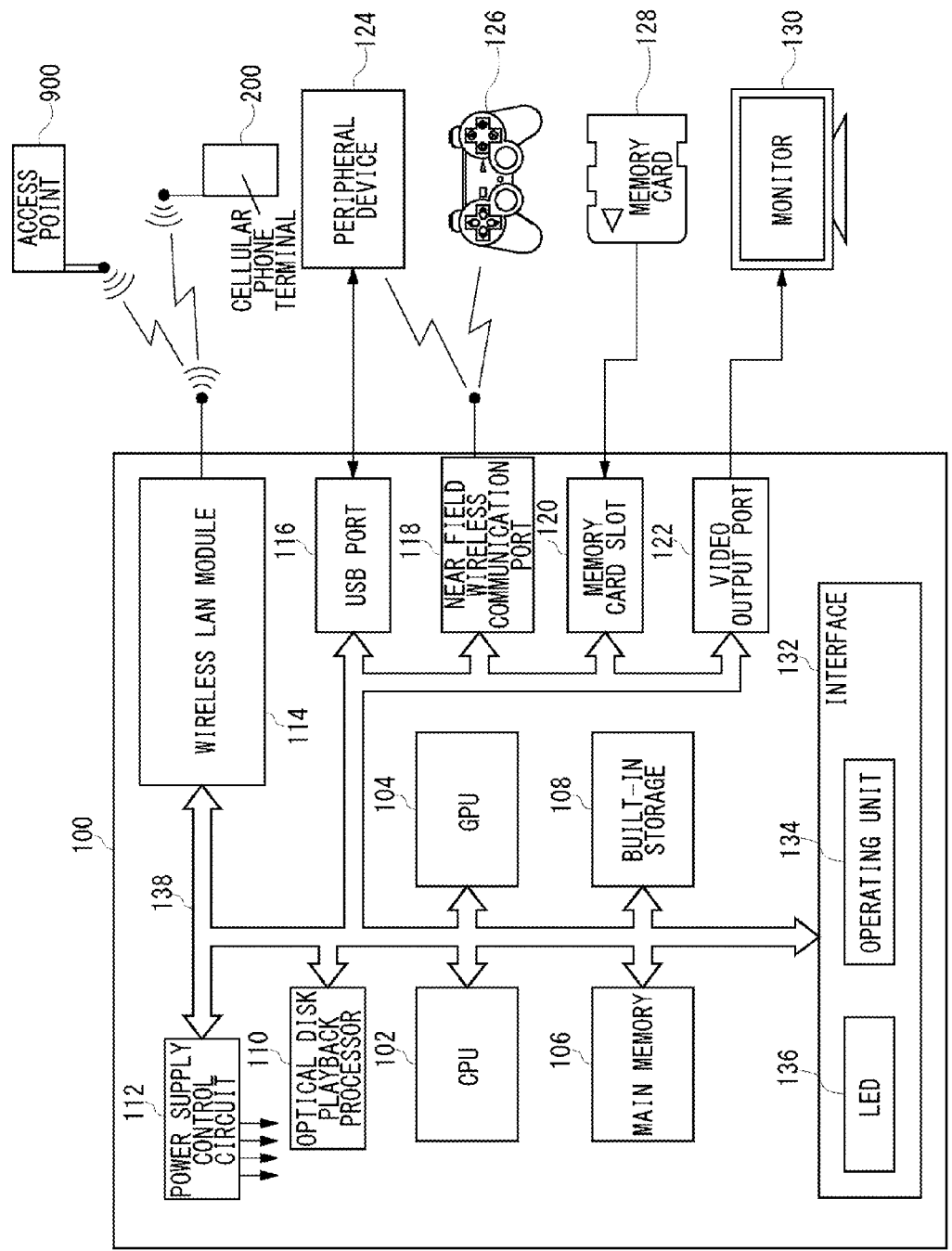
FIG. 2 is a block circuit diagram which shows a schematic configuration of an internal circuit of an information terminal apparatus.

FIG. 2 is a block circuit diagram which shows a schematic configuration of an internal circuit of the information terminal apparatus 100. The information terminal apparatus 100 includes, as its basic components, a CPU (Central Processor Unit) 102, a GPU (Graphic Processor Unit) 104, main memory 106, a built-in storage 108, an optical disk playback processor 110, a power supply control circuit 112, and a wireless LAN module 114.

The CPU 102 is configured to perform signal processing and to control each internal component according to various kinds of application programs for games, e-mail, Web browsing, etc. The GPU 104 is configured to perform image processing. The optical disk playback processor 110 is configured to play back an optical disk such as BD (Blu-ray Disc: trademark), DVD, CD, or the like, on which application programs or multimedia data are recorded, which is inserted via an unshown optical disk playback unit. The main memory 106 functions as a buffer configured to temporarily store data read out from a work area of the CPU 102 or from an optical disk. The power supply control circuit 112 is configured to control a power supply (not shown) configured to supply electric power to each internal circuit which is a component of the information terminal apparatus 100. The wireless LAN module 114 is configured to transmit/receive information to/from a circuit that is external to the information terminal apparatus 100.

Furthermore, the information terminal apparatus 100 includes a USB port 116, a near field wireless communication port 118, a memory card slot 120, and a video output port 122. The USB port 116 is used to connect a peripheral device 124 such as an external hard disk drive or the like to the information terminal apparatus 100. The near field wireless communication port 118 allows the information terminal apparatus 100 to be connected wirelessly to the peripheral device 124, and to be connected wirelessly to the controller 126 for the information terminal apparatus 100. It should be noted that the controller 126 can be connected to the information terminal apparatus 100 via the USB port 116. The memory card slot 120 allows the information terminal apparatus 100 to transmit/receive information to/from a detachable memory card 128. The built-in storage 108 is configured to store an application program read out from an optical disk, game save data, or otherwise data such as photo data, video data, music data, etc., acquired via the USB port 116, the near field wireless communication port 118, or the memory card slot 120.

The GPU 104 has a function as a geometry transfer engine configured to perform processing such as coordinate transformation and so forth, and a function as a rendering processor. The GPU 104 is configured to perform a rendering operation according to a rendering instruction received from the CPU 102, and stores the image thus rendered in an unshown frame buffer. That is to say, in a case in which various kinds of application programs recorded on an optical disk employ so-called three-dimensional (3D) graphics as in games, for example, the GPU 104 is configured to perform geometry calculation processing so as to calculate the coordinate points or the like of polygons that are components of a three-dimensional object. Furthermore, the GPU 104 is configured to perform rendering processing so as to generate an image which can be obtained by acquiring an image of the three-dimensional object using a virtual camera, i.e., so as to perform perspective transformation (calculation of the coordinate points or the like obtained by projecting the vertexes of each polygon that forms the three-dimensional object onto a virtual camera screen). The image data thus obtained in the final stage of the calculation is written to the frame buffer. The video output port 122 allows a video signal that corresponds to the image generated by the GPU 104 to be output on a monitor 130 such as a TV or the like.

An interface 132 of the information terminal apparatus 100 includes an operating unit 134 which allows the user to turn on the power supply, and to eject an optical disk, and LEDs 136 which indicate the on/off state of the power supply, the access state of each device, and so forth.

These components are mutually connected to each other mainly via a bus line 138. Furthermore, electric power is supplied to each internal circuit of the information terminal apparatus 100 from a power supply. It should be noted that the CPU 102 and the GPU 104 are connected to each other via a dedicated bus. Upon turning on the power supply for the information terminal apparatus 100 having such a configuration, an operating system program is read out from an unshown mask ROM and is loaded into the main memory 106, and the CPU 102 executes the operating system program. With such an arrangement, the CPU 102 is configured to integrally control each component of the information terminal apparatus 100.

When the CPU 102 executes the operating system program, first, the CPU 102 performs an initialization operation such as operation confirmation processing, etc. Subsequently, the CPU 102 reads out an application program such as a game application or the like recorded on the optical disk. After the application program is loaded into the main memory 106, the CPU 102 executes the game application program. By executing the game application program, the CPU 102 is configured to control the GPU 104 and so forth according to an instruction from the user via the controller 126 so as to control a display operation for images, and to control generation of sound effects and musical sound. Furthermore, when the power supply for the information terminal apparatus 100 is turned on by means of a remote control operation, an automatic operation is executed according to an autopilot program stored in the built-in storage 108.

Figure 3:
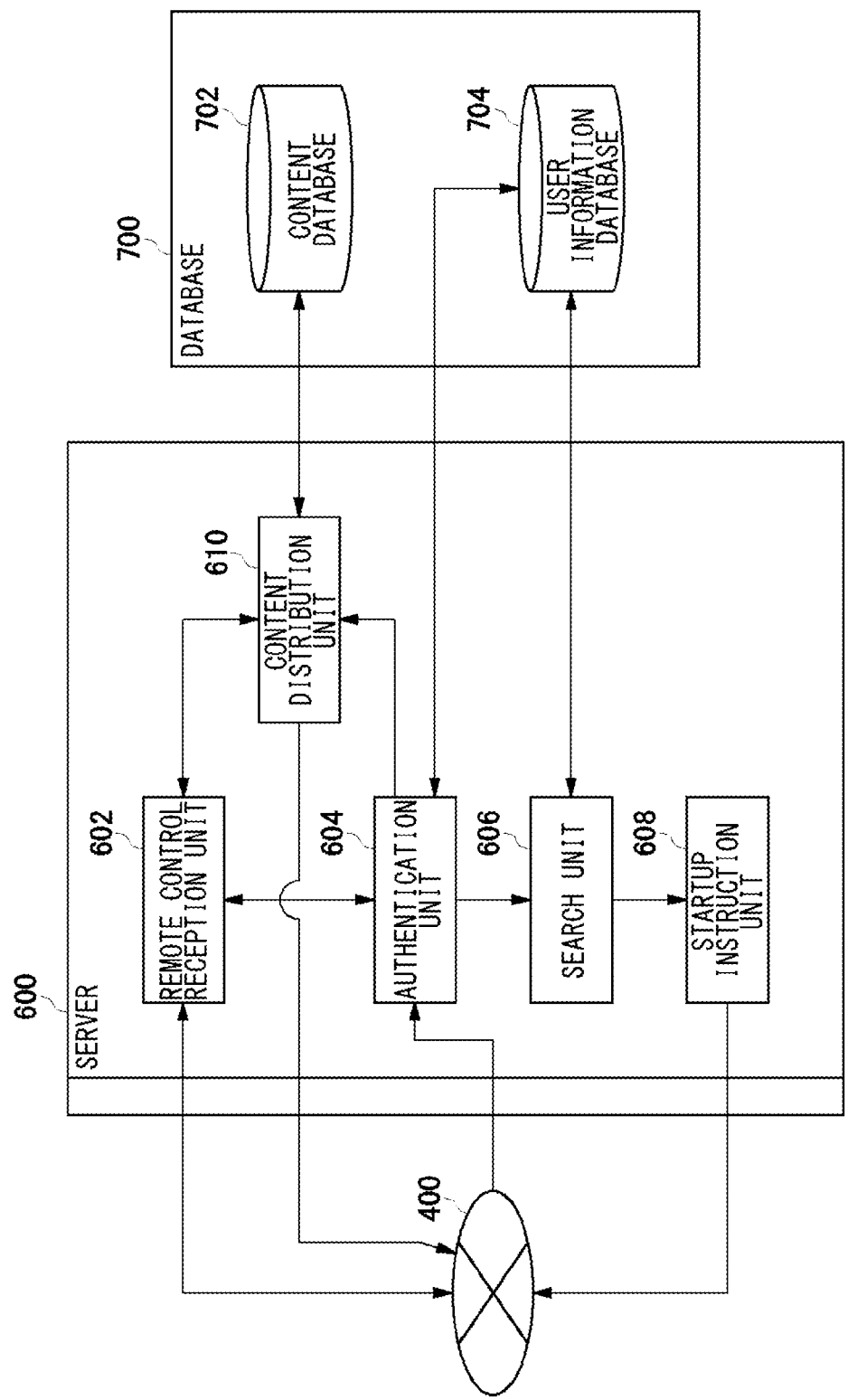
FIG. 3 is a schematic diagram which shows an internal configuration of a server and a database according to the embodiment.

FIG. 3 is a schematic diagram which shows an internal configuration of the server 600 and the database 700 according to the embodiment. The server 600 includes a remote control reception unit 602, an authentication unit 604, a search unit 606, a startup instruction unit 608, and a content distribution unit 610. The database 700 includes a content database 702 and a user information database 704.

The remote control reception unit 602 is configured to receive a request for a remote control operation for the information terminal apparatus 100 from the user via the Internet 400. The remote control reception unit 602 is configured to operate as a Web server. Such an arrangement allows the user to establish a connection to the remote control reception unit 602 from the remote control terminal apparatus 500 via the Internet 400 using a secure communication protocol such as Https (Hypertext Transfer Protocol over Secure Socket Layer) or the like.

The authentication unit 604 is configured to check the validity of the user information acquired from the remote control reception unit 602. The user information database 704 is configured to store user information such as user names, passwords, and so forth, of valid users who have permission to establish a connection to the server 600. Based upon the user information stored in the user information database 704, the authentication unit 604 is configured to authenticate the validity of the user information acquired by the remote control reception unit 602. When the user information thus acquired is valid, the authentication unit 604 is configured to transmit the user information to the search unit 606.

The search unit 606 is configured to search the user information database 704 based upon the user information acquired from the authentication unit 604, and to acquire the phone number of the cellular phone terminal 200 which can be used to remotely control the information terminal apparatus 100. Thus, each user name and the corresponding phone number of a cellular phone terminal 200 are stored in a mutually associated manner. Furthermore, the user information database 704 stores the number of information terminal apparatuses 100 owned by each user and the respective device IDs assigned for their identification such that they are mutually associated with the corresponding user name. The search unit 606 is configured to acquire the phone number of the cellular phone terminal 200 and the ID number of the information terminal apparatus 100 registered in the user information database 704.

The remote control reception unit 602 is configured to acquire the phone number of the cellular phone terminal 200 and the information with respect to the information terminal apparatus 100 from the search unit 606 via the authentication unit 604, and to present this information to the user via the Internet 400. The remote control reception unit 602 is configured to receive the phone number of the cellular phone terminal 200 and the ID number of the information terminal apparatus 100 selected by the user in order to perform a remote control operation. Furthermore, the remote control reception unit 602 acquires, from the user, the information with respect to the content to be downloaded to the information terminal apparatus 100.

The startup instruction unit 608 is configured to acquire the result of the user's selection acquired by the remote control reception unit 602, to establish a connection to the cellular phone terminal 200, which allows the user to perform a remote control operation, via the cellular phone communication network 300 based upon the phone number thus acquired, and to transmit a packet which is an instruction via the cellular phone terminal 200 to start up the information terminal apparatus 100 positioned within range of being connectable to the cellular phone terminal 200. The startup instruction unit 608 employs a modem or the like, for example, to establish such a connection to the cellular phone communication network 300.

Figure 4:
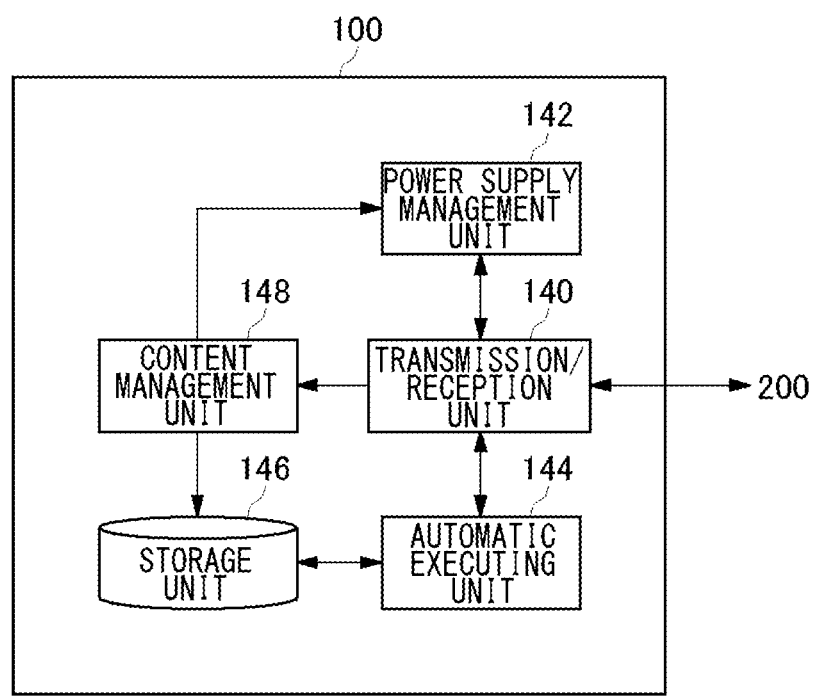
FIG. 4 is a schematic diagram which shows the functions of the information terminal apparatus according to the embodiment.

FIG. 4 is a schematic diagram showing each function of the information terminal apparatus 100 according to the embodiment. The information terminal apparatus 100 includes a transmission/reception unit 140, a power supply management unit 142, an automatic executing unit 144, a storage unit 146, and a content management unit 148.

The transmission/reception unit 140 may be configured as the wireless LAN module 114 shown in FIG. 2. When the power supply for the information terminal apparatus 100 is off, the transmission/reception unit 140 is in the standby state in which it can receive, from an external device, a packet which is an instruction to start up the information terminal apparatus 100. Upon receiving a packet which is an instruction to start up the information terminal apparatus 100 from the startup instruction unit 608 of the server 600 via the cellular phone terminal 200, the transmission/reception unit 140 is configured to transmit the packet thus received to the power supply management unit 142.

The power supply management unit 142 is configured as an internal module of the power supply control circuit 112 shown in FIG. 2. Upon receiving a packet which is an instruction to start up the information terminal apparatus 100 from the transmission/reception unit 140, the power supply management unit 142 is configured to turn on the power supply for the information terminal apparatus 100. This operation is referred to as a so-called "Wake On LAN" operation.

Here, the "Wake On LAN" technique represents a technique in which a special packet is remotely transmitted to a target device via a network so as to turn on a power supply for the target device or otherwise to shut down the target device. There are several known packet formats employed in the "Wake On LAN" technique. For example, an arrangement may be made configured to provide the "Wake On LAN" function using a known technique such as the aforementioned magic packet or the like. Before such a packet is transmitted to the information terminal apparatus 100, the cellular phone terminal 200 is configured to automatically execute a sequence of communication session establishment steps, e.g., a step in which caller identification is performed based upon the caller identification number (Caller ID) information registered beforehand whether or not the call request matches a predetermined source such as the server 600 or the like, a step in which the call request is automatically accepted after the cellular phone terminal 200 is called a predetermined number of times (e.g., five times), a packet communication preparation step, which is started after the call request is accepted, and a step in which the server 600 is notified that the packet communication preparation has been completed. Subsequently, a communication operation is started. With such an arrangement, the cellular phone terminal 200 maintains the communication session (communication path) via the cellular phone communication network 300 after a connection session with the server 600 is established.

As described above, when the power supply for the information terminal apparatus 100 is turned on, the CPU 102 shown in FIG. 2 is configured to execute the operating system program. In this state, the CPU 102 is capable of integrally controlling each component of the information terminal apparatus 100. By the CPU 102 executing a program stored in the storage unit 146, such an arrangement provides the function of the automatic executing unit 144 shown in FIG. 4. In this stage, such an arrangement is configured to attempt an automatic login to the server 600 via the transmission/reception unit 140. It should be noted that the storage unit 146 is configured as the built-in storage 108 shown in FIG. 2.

The content management unit 148 is configured to download content from the content distribution unit 610 included within the server 600 described later, and to store the content thus downloaded in the storage unit 146. After the download is completed, the content management unit 148 is configured to transmit a notice that the download has been completed, to the power supply management unit 142 and the content distribution unit 610 included within the server 600 via the transmission/reception unit 140. Upon receiving such a notice that the download has been completed, the power supply management unit 142 turns off the power supply for the information terminal apparatus 100. In this state, the transmission/reception unit 140 enters the standby state.

It should be noted that when the power supply for the information terminal apparatus 100 is turned on before the transmission/reception unit 140 receives a packet which is an instruction to start up the information terminal apparatus 100 from the startup instruction unit 608 included within the server 600, upon receiving such a packet, the automatic executing unit 144 is configured to attempt an automatic login operation.

The configuration of the information terminal apparatus 100 may be realized by means of hardware components such as a CPU and memory included in a given computer, or may be realized by means of a program loaded into the memory. However, the drawings each show only functional blocks provided by combining such components. Accordingly, such functional blocks can be realized by hardware components alone, software components alone, or various combinations thereof, which can be readily conceived by those skilled in this art. Examples of such an information terminal apparatus 100 include a stationary game machine.

Description will be made returning to FIG. 3. The authentication unit 604 is configured to verify the validity of an automatic login requested from the information terminal apparatus 100, and to notify the content distribution unit 610 of the verification result. When the verification result acquired from the authentication unit 604 indicates "valid login", the content distribution unit 610 acquires, from the remote control reception unit 602, the information with respect to the content to be transmitted to the information terminal apparatus 100. The content distribution unit 610 is configured to acquire, from the content database 702 configured to store the content, the content to be transmitted to the information terminal apparatus 100, and to transmit the content thus acquired to the information terminal apparatus 100 via the Internet 400.

Upon receiving a notice from the information terminal apparatus 100 that the download operation has ended, the content distribution unit 610 notifies the remote control reception unit 602 of this information. The remote control reception unit 602 is configured to execute a series of post-processing steps involved in the remote control operation, such as charging a fee to the user and so forth. Subsequently, the remote control reception unit 602 is configured to notify the remote control terminal apparatus 500 of completion of the download operation.

The configuration of the server 600 may be realized by means of hardware components such as a CPU and memory included in a given computer, or may be realized by means of a program loaded into the memory. However, the drawings each show only functional blocks provided by combining such components. Accordingly, such functional blocks can be realized by hardware components alone, software components alone, or various combinations thereof, which can be readily conceived by those skilled in this art.

Figure 5:
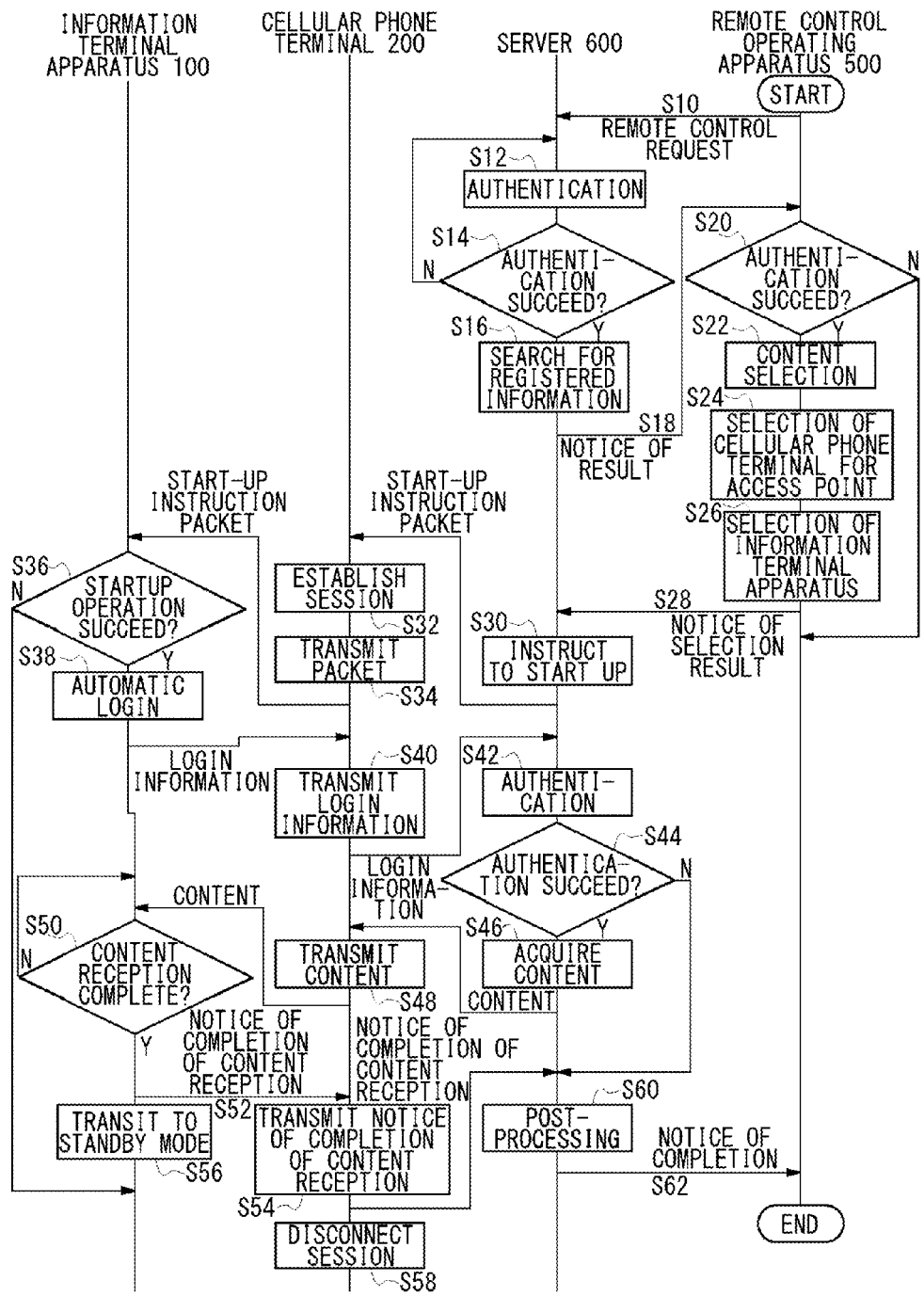
FIG. 5 is a flowchart for describing the flow of the operation of the remote control system according to the embodiment.

FIG. 5 is a sequence diagram which shows the operation and the communication procedure of the remote control system 800 according to the embodiment in a time-series manner. In the sequence diagram shown in FIG. 5, each step of each unit or each step in the communication procedure will be indicated by a combination of "S" (which is the initial letter of "Step") which represents "Step" and a number. With such an arrangement, when the judgment result is "true" in a given judgment step represented by a combination of "S" and a number, the judgment result is represented by the addition of "Y" (which is the initial letter of "Yes"). In this case, the judgment result is represented by "Y in S14", for example. Conversely, when the judgment result is "false", the judgment result is represented by the addition of "N" (which is the initial letter of "No"). In this case, the judgment result is represented by "N in S14", for example. The operation for this sequence is started when the user gives an instruction to the server 600 via the remote control terminal apparatus 500 to perform a remote control operation.

The remote control reception unit 602 included within the server 600 receives a request from the remote control terminal apparatus 500 via the Internet 400 to remotely control the information terminal apparatus 100 (S10). The authentication unit 604 verifies the validity of the remote control request acquired from the remote control reception unit 602 (S12). The remote control request includes information with respect to the user ID and the password registered beforehand in the user information database included within the server 600.

Figures 6, 7:
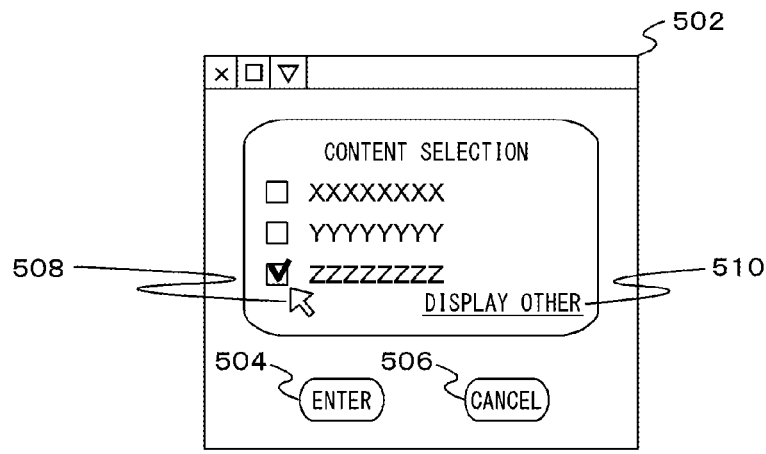
FIG. 6 is a schematic diagram which shows a data structure of a user information database included within the database.
FIG. 7 is a diagram which shows an example of a content selection screen displayed on a web browser on a remote control terminal apparatus.

FIG. 6 is a schematic diagram which shows a data structure of the user information database 704 stored in the database 700. The user information database 704 is configured to store, as the user IDs, user names or otherwise account names, thereby allowing respective individual users to be uniquely identified. The user information database 704 further stores the corresponding password, e-mail address, phone number of the cellular phone terminal 200 which can be connected to the user's information terminal apparatus 100, and ID number of the information terminal apparatus 100, such that they are mutually associated with the user ID. Also, multiple cellular phone terminals 200 or multiple information terminal apparatuses 100 may be registered for each user ID. In a case in which multiple cellular phone terminals 200 or multiple information terminal apparatuses 100 are registered, a particular cellular phone terminal 200 and a particular information terminal apparatus 100, which were used in the immediately previous remote control operation, are indicated by the letters "AP (Access Point)" and "CL (Client)", respectively.

The authentication unit 604 included within the server 600 is configured to search the user information database 704 so as to verify the validity of the remote control request. When the authentication result is that the request cannot be validated (N in S14), the authentication unit 604 notifies the remote control terminal apparatus 500 to that effect, and prompts the user to attempt to establish a connection again. When the authentication is successful (Y in S14), the search unit 606 retrieves and acquires all the information with respect to the phone numbers of the cellular phone terminals 200 and the information terminal apparatuses 100 registered on the user information database 704 (S16).

When the verification result indicates "valid", the remote control reception unit 602 instructs the search unit 606 to transmit, to the remote control terminal apparatus 500 via the Internet 400, the information with respect to the phone numbers of the cellular phone terminals 200 and the information terminal apparatuses 100 acquired via the authentication unit 604. When the verification result indicates "invalid", the remote control reception unit 602 notifies the remote control terminal apparatus 500 of the invalid verification result via the Internet 400 (S18).

When the authentication is successful (Y in S20), the remote control terminal apparatus 500 allows the user to select content to be downloaded to the information terminal apparatus 100 (S22). Subsequently, the user selects a cellular phone terminal 200 to be used as an access point for the remote control operation (S24), and selects an information terminal apparatus 100 to which the content thus selected is to be downloaded (S26).

FIG. 7 is a diagram which shows an example of a content selection screen 502 displayed on the web browser on the remote control terminal apparatus 500. The content that can be downloaded is displayed on the content selection screen 502, which allows the user to select desired content by operating a pointer 508 via the operation of an unshown user interface such as a mouse or the like. Furthermore, such an arrangement allows the user to display other lists (not shown) of selectable content by clicking "display other" (denoted by reference numeral 510) displayed on the content selection screen 502. When the user desires to finish the content selection, by clicking "enter" (denoted by reference numeral 504), the selection result is transmitted to the remote control reception unit 602 included within the server 600. Otherwise, by clicking "cancel" (denoted by reference numeral 506), such an arrangement allows the user to cancel the content selection operation.

Figure 8:
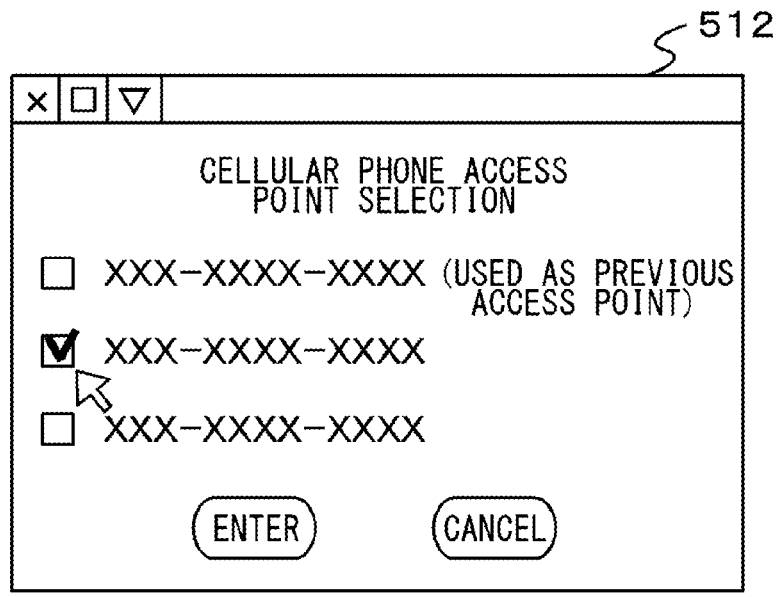
FIG. 8 is a diagram which shows an example of a cellular phone terminal selection screen displayed on a web browser on a remote control terminal apparatus.

FIG. 8 is a diagram which shows an example of a selection screen 512 displayed on the web browser executed on the remote control terminal apparatus 500 for selecting the cellular phone terminal 200. The selection screen 512 for selecting the cellular phone terminal 200 displays the phone numbers of the cellular phone terminals that can be used as access points. Furthermore, the cellular phone terminal 200 that was used as an access point in the immediately previous remote control operation is indicated as such. It should be noted that, in a case in which there is only a single cellular phone terminal 200 registered on the user information database 704, such an indication may be omitted. Furthermore, via an unshown access point management screen, such an arrangement allows the user to add and to delete the phone number of a desired cellular phone terminal 200 that can be used as an access point.

Figure 9:
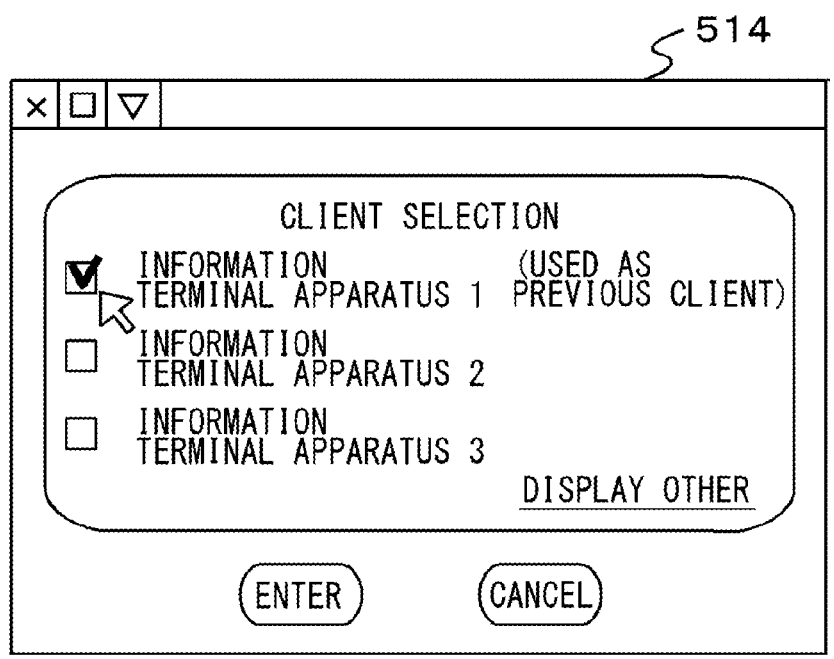
FIG. 9 is a diagram which shows an example of an information terminal apparatus selection screen displayed on a web browser on a remote control terminal apparatus.

FIG. 9 is a diagram which shows an example of a selection screen 514 for selecting the desired information terminal apparatus 100, which is displayed on the web browser executed on the remote control terminal apparatus 500. The selection screen 514 on the remote control terminal apparatus 500 displays a list of the information terminal apparatuses 100 for selecting a desired information terminal apparatus 100 to which content is to be downloaded. Furthermore, the information terminal apparatus 100 to which content was downloaded in the immediately previous remote control operation is indicated as such. It should be noted that, in a case in which there is only a single information terminal apparatus 100 registered on the user information database 704, such an indication may be omitted, as with the selection screen 512 for selecting a desired cellular phone terminal 200. Furthermore, via an unshown information terminal apparatus management screen, such an arrangement allows the user to add and to delete a desired information terminal apparatus 100.

Via the selection screen 512 for selecting a desired cellular phone terminal 200 shown in FIG. 8 and the selection screen 514 for selecting a desired information terminal apparatus 100 shown in FIG. 9, such an arrangement allows the user to select a desired combination of the cellular phone terminal 200 and the information terminal apparatus 100 from among multiple possible combinations of the cellular phone terminal 200 and the information terminal apparatus 100 to be used to perform the remote control operation, even if the user possesses multiple information terminal apparatuses 100 and multiple cellular phone terminals 200. For example, in a case in which the user possesses multiple cellular phone terminals 200, the same cellular phone terminal 200 is not necessarily always set to the incoming call standby state in the user's home. In particular, such a cellular phone terminal 200 is very portable. Accordingly, the cellular phone terminal 200 to be connected to the information terminal apparatus 100 is often changed. Thus, it is a great advantage to allow the user to select the cellular phone terminal to be used every time the user makes a request to perform a remote control operation.

Description will be made returning to FIG. 5. The remote control reception unit 602 included within the server 600 receives, from the remote control terminal apparatus 500 via the Internet 400, the selection result with respect to a combination of the phone number of the cellular phone terminal 200 and the information terminal apparatus 100 to be used for the remote control operation, and the selection result with respect to the content to be downloaded (S28). The startup instruction unit 608 included within the server 600 establishes, based upon the phone number acquired from the remote control reception unit 602, a connection to the cellular phone terminal 200 that can be used for the remote control operation via the cellular phone communication network 300, and gives an instruction, via the selected cellular phone terminal 200, to start up the information terminal apparatus 100 located within range of being connectable to the selected cellular phone terminal 200 (S30). Specifically, the startup instruction unit 608 transmits a packet which is an instruction for the information terminal apparatus 100 to start up. The cellular phone terminal 200 establishes a communication session (communication path) with the server 600 via the cellular phone communication network 300 (S32), and transmits, to the information terminal apparatus 100, a packet which is an instruction to start up (S34). Subsequently, the cellular phone terminal 200 maintains the communication session (communication path) with the server 600.

Upon receiving, via the transmission/reception unit 140, a packet which is an instruction for the information terminal apparatus 100 to start up, the power supply management unit 142 included within the information terminal apparatus 100 attempts to turn on the power supply for the information terminal apparatus 100. When the power supply is turned on and the start-up operation succeeds (Y in S36), the automatic executing unit 144 included within the information terminal apparatus 100 automatically attempts a login to the server 600 via the transmission/reception unit 140 (S38). When such an arrangement to perform such a start-up operation does not succeed (N in S36), the transmission/reception unit 140 is maintained in the standby state.

The cellular phone terminal 200 functions as a relay for the login information with respect to login from the information terminal apparatus 100 to the server 600. That is to say, the cellular phone terminal 200 transmits the login information to the server 600 (S40). The authentication unit 604 included within the server 600 verifies the validity of the automatic login request from the information terminal apparatus 100, thereby providing an authentication operation (S42). It should be noted that, with the present embodiment, in a case in which both the transmission path (communication path via the cellular phone communication network 300) used by the startup instruction unit 608 to transmit a packet which is an instruction to start up and the path (communication path via the cellular phone communication network 300) used by the automatic executing unit 144 to perform the automatic login operation are generated in the same communication session step, the automatic login authentication step S42 may be omitted. Such an arrangement is capable of reducing time and calculation costs required for the authentication, such as access to the user information database 704 and so forth, which is a great advantage. In particular, in a case in which a large number of automatic login requests are made by a large number of users, such an arrangement is capable of effectively reducing the load on the server.

When the verification result acquired from the authentication unit 604 indicates "valid" (Y in S44), the content distribution unit 610 included within the server 600 acquires the content to be transmitted to the information terminal apparatus 100 from the content database 702 (S46), and transmits the content thus acquired to the information terminal apparatus 100. The cellular phone terminal 200 functions as a relay for the content to be transmitted from the server 600 to the information terminal apparatus 100, i.e., transmits the content to the information terminal apparatus 100 (S48). When the verification result indicates "invalid" (N in S44), the content distribution unit 610 transmit no content to the information terminal apparatus 100.

When judgment is made that the download of the content from the content distribution unit 610 is not complete (N in S50), the content management unit 148 included within the information terminal apparatus 100 continues the download operation. When judgment is made that the download of the content from the content distribution unit 610 is complete (Y in S50), the content management unit 148 included within the information terminal apparatus 100 notifies the content distribution unit 610 included within the server 600 to that effect (S52). The cellular phone terminal 200 functions as a relay for the reception completion notice from the information terminal apparatus 100 to the server 600, and transmits the information to the server 600 (S54). The power supply management unit 142 included within the information terminal apparatus 100 also receives a download completion notice from the content management unit 148. Upon receiving such a download completion notice, the power supply management unit 142 turns off the power supply for the information terminal apparatus 100. In this stage, the transmission/reception unit 140 enters the standby state (S56). In this state, the cellular phone terminal 200 ends the communication, and disconnects the communication session with the server 600 via the cellular phone communication network 300 (S58).

Upon receiving a download completion notice from the content distribution unit 610, the remote control reception unit 602 included within the server executes a series of post-processing steps involved in the remote control operation, such as charging a fee to the user and so forth (S60). Subsequently, the remote control reception unit 602 notifies the user of the automatic login result of whether the automatic login of the user has been a success or failure, and so forth. When the automatic login of the user has been a success, the remote control reception unit 602 notifies the user that the download of the content is completed, and so forth (S62).

When the remote control terminal apparatus 500 receives a notice from the remote control reception unit 602 included within the server 600, or otherwise when authentication of a request for the remote control operation does not succeed (N in S20), the operation shown in the flowchart ends.

The operation of the aforementioned arrangement is as follows. The user accesses the server 600 via a cellular phone terminal or otherwise a PC (remote control terminal apparatus 500) located at a desired position that is different from the user's home, and selects the content to be downloaded, the information terminal apparatus 100 to be used as a download destination, and the cellular phone terminal 200 to be used as an access point. The server 600 transmits, via the cellular phone communication network 300, a packet which is an instruction to start up the information terminal apparatus 100 selected by the user, thereby starting up the information terminal apparatus 100. The information terminal apparatus 100 automatically logs in to the server 600, and downloads the desired content from the server 600.

As described above, with the present embodiment, such an arrangement is configured to transmit a packet which is an instruction to start up via the cellular phone communication network 300 without involving a router or a proxy server. Thus, such an arrangement is capable of avoiding a problem in that, in some cases, when attempting to send a start-up instruction via an existing WAN (Wide Area Network), a router or a proxy server blocks such a packet which is an instruction to start up.

While description has been made regarding the present invention with reference to the embodiment, such description is for illustrative purposes only, and it is to be understood by those skilled in this art that changes and variations may be made without departing from the spirit or scope of the appended claims. Description will be made below regarding such modifications.

Description has been made above regarding an arrangement in which the transmission path used by the startup instruction unit 608 included within the server 600 to transmit a start-up instruction packet and the path used by the automatic executing unit 144 included within the information terminal apparatus 100 to perform the automatic login operation both involve the cellular phone communication network 300. Also, an arrangement may be made in which the path used for the automatic login operation does not involve the cellular phone communication network 300. Description will be made bellow regarding such an arrangement.

Figure 10:
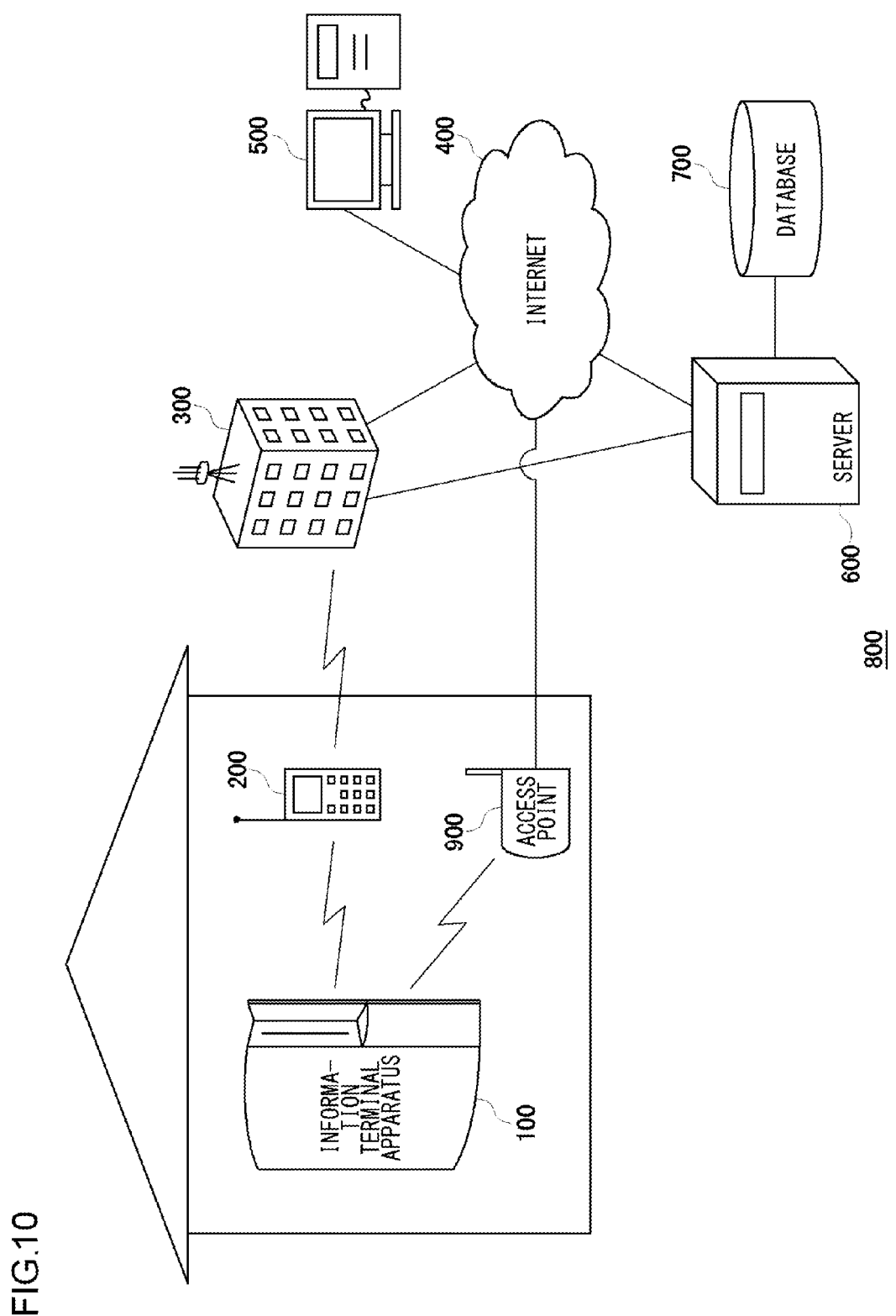
FIG. 10 is a schematic diagram which shows the outline of the remote control system according to another embodiment.

FIG. 10 is a schematic view showing the outline of the remote control system 800 according to another embodiment. The point of difference between FIG. 1 and FIG. 10 is that a system shown in FIG. 10 further includes an access point 900.

In this example, when the information terminal apparatus 100 starts up after it receives a start-up instruction packet from the server 600, the automatic executing unit 144 included within the information terminal apparatus 100 is configured to establish a connection to the server 600 via the access point 900 that can be connected to the Internet 400, without involving the cellular phone terminal 200.

With such an arrangement in which the path used to establish a connection from the information terminal apparatus 100 to the server 600 is configured as the Internet 400, which is an existing network, instead of the cellular phone communication network 300, in a case in which the cost required for the existing Internet 400 is lower than that for the cellular phone communication network 300, such an arrangement provides an advantage of a reduced cost required for the connection operation. In particular, in a case in which the data size of the content is large, such an arrangement uses a path having a low cost to download the content from the server 600 to the information terminal apparatus 100, thereby providing a great advantage of reduced costs required for communication. Furthermore, such a system includes two paths, i.e., a path configured using the cellular phone communication network 300 and a path configured using the existing Internet 400, i.e., it has a redundant path structure, thereby providing an advantage of improved communication reliability.

Description has been made mainly regarding an arrangement in which the information terminal apparatus 100 is configured to play back content such as games, movies, and so forth. However, the information terminal apparatus 100 is not restricted in particular as long as it is an apparatus configured to start up upon receiving a start-up instruction packet. Examples of the information terminal apparatus 100 include a DVR (Digital Video Recorder) configured to record TV broadcast content, a TV tuner, a home server configured to store content such as photos or music, video, or documents and the like, and a surveillance camera for monitoring a user's pet, and so forth. Such a system allows the user to start up such an apparatus via the server 600, and to monitor, via the remote control terminal apparatus 500, the content stored in the apparatus remotely controlled or otherwise a video image acquired by the camera remotely controlled.

Description has been made regarding an arrangement in which the remote control terminal apparatus 500 is configured to start up the information terminal apparatus 100 via the server 600 and the cellular phone terminal 200. Also, the remote control terminal apparatus 500 may be configured to start up the information terminal apparatus 100 via the cellular phone terminal 200 alone. In this case, the remote control terminal apparatus 500 is configured as a cellular phone terminal, for example. With such an arrangement, the user instructs the cellular phone terminal that functions as the remote control terminal apparatus 500 to establish a connection to the cellular phone terminal 200 that can be connected to the information terminal apparatus 100, thereby allowing the information terminal apparatus 100 to be remotely controlled. Such an arrangement allows various kinds of files such as video image files, music files, and so forth, to be transmitted from the information terminal apparatus 100 to the cellular phone terminal in the user's hand. That is to say, such an arrangement allows the user to use the information terminal apparatus 100 as a home server, which is also an advantage.

Description has been made regarding an arrangement in which the information terminal apparatus 100 is configured to receive a start-up instruction packet from the server 600 via the cellular phone communication network 300 using the cellular phone terminal 200 that can be locally connected to the information terminal apparatus 100. However, such an apparatus to be connected to the cellular phone communication network 300 is not restricted to such a cellular phone terminal 200. For example, such an arrangement may employ a portable game machine mounting a module that can access the cellular phone communication network 300, instead of employing the cellular phone terminal 200.

What is claimed is:

1. A remote control system comprising:
   a server; and
   an information terminal apparatus, which is connected to a cellular phone terminal through a local network connection,
   wherein the server is configured to receive a request to remotely control the information terminal apparatus,
   wherein the server is further configured to authenticate validity of the request, and, when the request is valid, to receive a request by a user specifying a phone number of a particular access point of a cellular phone communication network that corresponds to the cellular phone terminal,
   wherein the server connects to the cellular phone terminal using the phone number of the particular access point and transmits a start-up instruction packet to the particular access point via the cellular phone communication network,
   wherein the particular access point sends the start-up instruction packet to the information terminal apparatus via the local network connection, and
   wherein, upon receiving such a start-up instruction packet transmitted from the server, the information terminal apparatus is configured to start up and to establish a network connection to the server.

2. The system according to claim 1, wherein, after the information terminal apparatus starts up upon receiving a start-up instruction packet transmitted from the server via the cellular phone terminal, the information terminal apparatus is configured to establish a connection to the server by using the cellular phone terminal of the particular access point as a proxy connection.

3. The system according to claim 1, wherein, after the information terminal apparatus starts up upon receiving a start-up instruction packet transmitted from the server via the cellular phone terminal, the information terminal apparatus is configured to establish a connection to the server via the Internet, the connection being that which is different from the connection the server established with the particular access point of the cellular phone terminal.

4. A server comprising:
   a remote control reception unit configured to receive, from a user via a network, a request to remotely control an information terminal;
   a search unit configured to search a database and to acquire one or more phone numbers of access points of cellular phone terminals that can be used for a remote control operation;
   a reception unit configured to receive a selection from the user specifying a selected phone number of a particular access point upon validating the request; and
   a start-up instruction unit configured to establish a connection to a cellular phone terminal using the selected phone number via the particular access point that can be used for the remote control operation via a cellular phone communication network, and to transmit to the cellular phone terminal a packet as an instruction to start up an information terminal apparatus, wherein the information terminal apparatus is connectable to the cellular phone terminal via a local area network, and wherein the cellular phone terminal sends the packet as an instruction to start up to the information terminal apparatus.

5. The server according to claim 4, wherein the remote control reception unit is configured to provide the user with information with respect to the one or more phone numbers of the access points and information terminal apparatuses acquired in the search operation of the search unit on a selection screen, and configured to receive the selection from the user specifying the selected phone number of a particular access point with a further selection of the information terminal apparatus to be used for content distribution.

6. A server connection method for a system that comprises a server, and an information terminal apparatus that is enabled to be connected to a cellular phone terminal via a local area network, the cellular phone terminal enabled to be connected to the server, the server connection method comprising:

receiving, by means of the server, a request to remotely control the information terminal apparatus, and authenticating validity of the request;

receiving a selection from a user specifying a selected phone number of a particular access point upon validation of the request;

connecting the server to the cellular phone terminal via the particular access point through the selected phone number through a cellular phone communication network;

transmitting, by means of the server, a start-up instruction packet to the cellular phone terminal after connection is made to the server when the aforementioned request is validated, wherein the cellular phone terminal sends the start-up instruction packet to the information terminal apparatus via the local area network; and starting up the information terminal apparatus, and connecting the information terminal apparatus to the server via a network upon receiving such a start-up instruction packet transmitted from the server.

7. A non-transitory computer-readable recording medium storing a computer program, wherein the computer program comprises:

an instruction configured to provide a function for receiving a request from a user via a network to remotely control an information terminal apparatus;

an instruction configured to provide a function for searching a database so as to acquire one or more phone numbers of access points of cellular phone terminals that can be used for a remote control operation;

an instruction configured to provide a function for receiving a selection from the user specifying a selected phone number of a particular access point upon validating the request;

an instruction configured to provide a function for establishing a connection to a cellular phone terminal using the selected phone number via the particular access point through a cellular phone communication network that can be used for a remote control operation, and a function for transmitting, to the particular access point and via a local area network of the cellular phone terminal, a packet as an instruction to start up an information terminal apparatus that is connected to the local area network of the cellular phone terminal.

* * * * *